(No Model.)

J. P. LAUER.
HANDSAW.

No. 346,482.  Patented Aug. 3, 1886.

Witnesses:
T. H. Parsons.
F. W. Fay.

Jean P. Lauer
Inventor, by
W. T. Miller
atty.

UNITED STATES PATENT OFFICE.

JEAN P. LAUER, OF BUFFALO, NEW YORK.

HANDSAW.

SPECIFICATION forming part of Letters Patent No. 346,482, dated August 3, 1886.

Application filed March 1, 1886. Serial No. 193,601. (No model.)

*To all whom it may concern:*

Be it known that I, JEAN P. LAUER, residing at Buffalo, in the county of Erie and State of New York, have invented certain new and useful Improvements in Saws; and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

My invention relates particularly to that class of saws in which the saw proper is removable from the frame, for the purpose of repairing or sharpening the same; and it consists in certain improvements, which will be more particularly hereinafter described and claimed.

Figure 1:
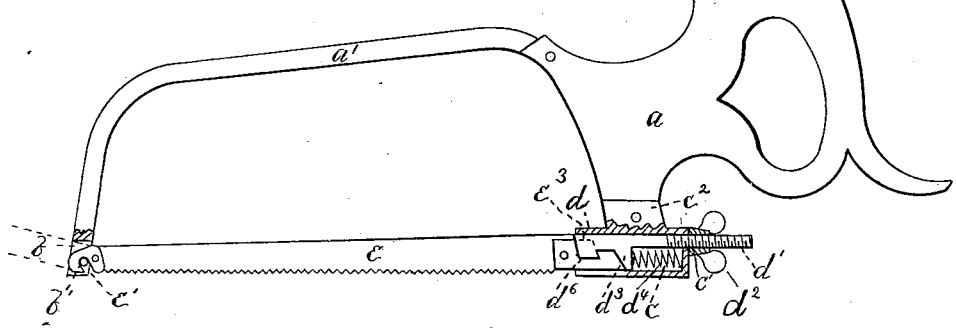
Figure 2:
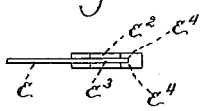
Figure 3:
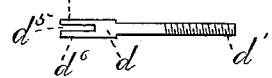
Figure 4:
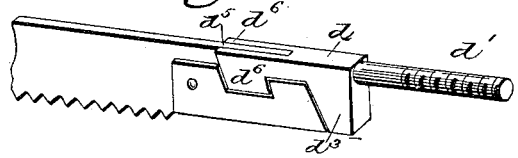

In the drawings, Figure 1 is a side view of the complete saw, with portions broken away in order to illustrate the attachment of the saw to the frame; and Figs. 2, 3, and 4, are detached detail views.

Referring to the drawings, $a$ is the handle of the saw, and $a'$ is the frame, rigidly secured thereto by rivets. The outer and lower end of the frame is provided with the slot $b$, open at the bottom; and centrally arranged within and across the slot is the bar or pivot $b'$. The lower end of the handle $a$ is provided with the extension $c$, having its lower portion formed with the recess $c'$ open at its inner end, and having the slot $c^2$ in its lower portion. Within this recess $c'$ is placed the catch device $d$, consisting of the screw-threaded rod $d'$, loosely extending through the rear outer wall of the recess $c'$, and having the thumb-nut $d^2$, adjustably and removably secured thereon.

$d^3$ is a shoulder extending to the bottom of the recess, between which and the rear outer wall of the recess $c'$ is placed the spiral spring $d^4$. The inner end of the device $d$ is slotted vertically, (as at $d^5$, see Fig. 3,) and formed with a catch, $d^6$, on each side of the slot.

$e$ is the saw, provided at its outer end with the inwardly-inclining slot $e'$, adapted for the reception of the pivot $b'$ in the outer end of the saw-frame. The inner end of the saw is provided with the recessed portion $e^2$, with the central vertical partition, $e^3$, forming the two catches $e^4$ $e^4$ on either side of the partition $e$.

The operation of adjusting the saw in its frame is as follows: The slotted end of the saw $e$ is placed in the position shown in dotted lines in Fig. 1, and the slot $e'$ and pivot $b'$ engaged one with the other. The saw is then swung around until the catches $e^4$ $e^4$ of the saw engage with the catches $d^6$ $d^6$ of the frame, the partition $e^3$ entering the slot $d^5$, and guiding the catches into engagement. The thumb nut $d^2$ is then turned until the parts are securely and firmly united. The saw may be removed by simply reversing the operation.

It will be seen that by my improved construction the outer end of the saw is so arranged that it is impossible to remove it from the frame without turning it into its dotted position, while at the inner end the partition $e^3$, entering the slot $d^5$, accurately and quickly guides the two parts into engagement, and the spring $d^4$ keeps the catches $d^6$ $d^6$ at all times in position for ready engagement without the necessity of hand manipulation.

I claim—

1. The combination, with the saw-frame $a'$, provided with the slot $b$ and pivot $b'$ at its outer end and the slotted recess $c'$ $c^2$ at its inner end, and the catching device $d$, consisting of the screw-threaded rod $d'$, the shouldered portion $d^3$, and the catches $d^6$ $d^6$, with the slot $d^5$ between them, of the saw having the inwardly-inclining slot $e'$, adapted for engagement with the pivot $b'$, and the catches $e^4$ $e^4$, with the vertical partition $e^3$ between them, adapted for engagement with the catching device $d$, and the spring $d^4$, and thumb-nut $d^2$, substantially as shown and described.

2. In a saw, in combination with the saw provided at its inner end with the catches $e^4$ $e^4$, with the vertical partition between them, of the catching device $d$, having the catches $d^6$ $d^6$, with the vertical slot $d^5$ between them, the shouldered portion $d^3$, the screw-threaded rod $d'$, with the thumb-nut $d^2$, and the spiral spring $d^4$, all located and operating within the recess $c'$ of the frame, substantially as and for the purpose stated.

In testimony whereof I have signed my name to this specification in the presence of two subscribing witnesses.

JEAN P. LAUER.

Witnesses:
W. L. HODGMAN,
W. T. MILLER.